US012664676B2

(12) United States Patent
Imran et al.

(10) Patent No.:  US 12,664,676 B2
(45) Date of Patent:       Jun. 23, 2026

(54) METHOD, SYSTEM AND NON-TRANSITORY COMPUTER-READABLE RECORDING MEDIUM FOR CREATING TRAINING DATASETS FOR MODEL TRAINING

(71) Applicant: MUSINSA Co., Ltd., Seoul (KR)

(72) Inventors: Saad Imran, Seoul (KR); Hyung Won Choi, Seoul (KR)

(73) Assignee: MUSINSA Co., Ltd., Seoul (KR)

( * ) Notice: Subject to any disclaimer, the term of this patent is extended or adjusted under 35 U.S.C. 154(b) by 357 days.

(21) Appl. No.: 18/212,893

(22) Filed: Jun. 22, 2023

(65) Prior Publication Data

US 2024/0037775 A1      Feb. 1, 2024

(30) Foreign Application Priority Data

Jun. 23, 2022     (KR) ........................ 10-2022-0076950

(51) Int. Cl.
*G06T 7/70*          (2017.01)
*G06V 10/25*        (2022.01)
*G06V 20/70*        (2022.01)

(52) U.S. Cl.
CPC ............... *G06T 7/70* (2017.01); *G06V 10/25* (2022.01); *G06V 20/70* (2022.01); *G06T 2207/20081* (2013.01); *G06V 2201/07* (2022.01)

(58) Field of Classification Search
CPC ............. G06T 7/70; G06T 2207/20081; G06T 2210/12; G06T 2210/16; G06V 10/25; G06V 20/70; G06V 2201/07; G06V 10/774; G06V 10/82; G06V 10/993
USPC ........................................................ 382/103
See application file for complete search history.

(56) References Cited

FOREIGN PATENT DOCUMENTS

| CN | 111950341 | * | 11/2020 |
| KR | 102390891 B1 | | 4/2022 |

* cited by examiner

*Primary Examiner* — Jerome Grant, II
(74) *Attorney, Agent, or Firm* — Dinsmore & Shohl LLP

(57)          ABSTRACT

A method of creating training data for model training is provided. The method includes: receiving image data including at least one fashion item; performing location box labeling on an item location box which indicates a location of an item included in the image data by using an item location detection model; calculating a location box labeling result value and a location box labeling confidence value; receiving a user's location box review value for the location box labeling result value; determining a location noise value of the location box review value by using the item location detection model; and determining the location box review value as location box training data if the location noise value meets a predetermined first criterion.

13 Claims, 4 Drawing Sheets

130

<u>100</u>

<u>130</u>

METHOD, SYSTEM AND NON-TRANSITORY COMPUTER-READABLE RECORDING MEDIUM FOR CREATING TRAINING DATASETS FOR MODEL TRAINING

CROSS-REFERENCE TO RELATED APPLICATION

This application claims priority to Korean Patent Application No. 10-2022-0076950 filed on Jun. 23, 2022, the entire contents of which are herein incorporated by reference.

TECHNICAL FIELD

The present disclosure relates to a method, a system, and a non-transitory computer-readable recording medium for creating training data for model training. Specifically, the present disclosure relates to a method, a system, and a non-transitory computer-readable recording medium for creating training data for a model training with improved accuracy by setting a labeling initial value using a training model for image data including fashion items and determining noise from a user's review value for initial value using the training model again.

BACKGROUND

Recently, as the demand for artificial intelligence (AI) model training has increased in various fields, related technology development and research have been actively conducted. In particular, the demand for technology using AI model has been increasing in the fashion industry to analyze and respond to rapidly changing trends.

To improve the accuracy of model training, it is necessary to train the model with a large amount of accurate data in advance. However, generating a large amount of training data requires a lot of resources. The method in the related art of manually labeling and generating training data requires a lot of time, human resources, and other costs. Further, the process of reviewing for incorrect labeling requires additional resources, and if incorrect labeling is not corrected properly, the quality of the training data is compromised.

In this regard, research has been conducted on data creating system that automatically labels raw data. For example, Korean Patent No. 10-2390891 discloses a training data processing service that performs automatic labeling of original images using a machine learning model and provides de-identification processing function for privacy-related objects.

However, in the related art, labeling is performed based on the inputs of labeling workers and checking workers, which may cause time and cost limitations for processing large amounts of data. In addition, there is still a lack of research on training data creating systems specialized for fashion items.

Therefore, the inventors of the present disclosure propose a training data creating service that allows labeling of large amounts of data to be performed quickly and simply, and with increased accuracy, by first determining the initial value of the labeling using a training model, reviewing the initial value of the labeling by a reviewer, and determining the noise by the training model again.

SUMMARY

One object of the present disclosure is to solve all the above-described problems.

Another object of the present disclosure is to provide accurate candidate data by determining labeling values for training data and automatically determining noise therefrom.

Yet another object of the present disclosure is to perform labeling large amounts of training data quickly and simply by using a trained model to set labeling initial values for the training data, while improving the accuracy.

Representative configurations of the present disclosure to achieve the above objects are described below.

According to one aspect of the present disclosure, there is provided a method of creating training data for a model training, comprising: receiving image data including at least one fashion item; performing location box labeling on an item location box which indicates a location of an item included in the image data by using an item location detection model; calculating a location box labeling result value and a location box labeling confidence value; receiving a user's location box review value for the location box labeling result value; determining a location noise value of the location box review value by using the item location detection model; and determining the location box review value as location box training data if the location noise value meets a predetermined first criterion.

The method according to one embodiment of the present disclosure may further comprises: performing attribute labeling for an attribute of an item located within the item location box by using an item attribute recognition model; calculating an attribute labeling result value and an attribute labeling confidence value; receiving a user's attribute review value for the attribute labeling result value; determining an attribute noise value of the attribute review value by using the item attribute recognition model; and determining the attribute review value as attribute training data if the attribute noise value meets a predetermined second criterion.

According to one embodiment of the present disclosure, in the step of performing the location box labeling, the item location box may be determined such that an item included in the image data is located within the item location box by using the item location detection model, and in the step of calculating the location box labeling result value and location box labeling confidence value, a coordinate value of an item location box on the image data may be determined by using the location box labeling result value, and the location box labeling confidence value indicating an accuracy of the item location box may be determined.

The method according to one embodiment of the present disclosure may further comprises receiving the user's location box review value again if the location noise value does not meet the predetermined first criterion.

The method according to one embodiment of the present disclosure may further comprises receiving the user's attribute review value again if the attribute noise value does not meet the predetermined second criterion.

According to one embodiment of the present disclosure, in the step of calculating the location box labeling result value and the location box labeling confidence value, if the location box labeling confidence value does not meet a predetermined third criterion, the location box labeling result value may be determined to be a null value.

According to one embodiment of the present disclosure, in the step of calculating the attribute labeling result value and the attribute labeling confidence value, if the attribute labeling confidence value does not meet a predetermined fourth criterion, the attribute labeling result value may be determined as a null value.

The method according to one embodiment of the present disclosure may further comprises training the item location detection model with the location box training data.

The method according to one embodiment of the present disclosure may further comprises training the item attribute recognition model with the attribute training data.

According to one embodiment of the present disclosure, in the step of receiving the user's location box review value for the location box labeling result value, the location box review value with a low location box labeling confidence value may be preferentially received. Further, in the step of receiving the user's attribute review value for the attribute labeling result value, the attribute review value with a low attribute labeling confidence value may be preferentially received.

According to another aspect of the present disclosure, there is provided a system of training data creating system for a model training, comprising: an image data receiving unit configured to receive image data including at least one fashion item; a pseudo labeling performing unit configured to perform location box labeling for an item location box which indicates a location of an item included in the image data by using an item location detection model, and calculate a location box labeling result value and a location box labeling confidence value; a labeling review value receiving unit configured to receive a user's location box review value for the location box labeling result value; a noise determination unit configured to determine a location noise value of the location box review value by using the item location detection model; and a training data determination unit configured to determine the location box review value as location box training data if the location noise value meets a predetermined first criterion.

According to another embodiment of the present disclosure, the pseudo labeling performing unit is configured to further perform attribute labeling for an attribute of an item located in the item location box by using the item attribute recognition model and calculate an attribute labeling result value and an attribute labeling confidence value, the labeling review value receiving unit is configured to receive a user's attribute review value for the attribute labeling result value, the noise determination unit is configured to determine an attribute noise value of the attribute review value by using the item attribute recognition model, and the training data determination unit is configured to determine the attribute review value as attribute training data if the attribute noise value meets a predetermined second criterion.

In addition, there are further provided other methods and systems to implement the present disclosure, as well as non-transitory computer-readable recording media having stored thereon computer programs for performing the methods.

According to the present disclosure, it is possible to suggest accurate candidate data and improve model accuracy by determining labeling values of training data and automatically determining noise.

Further, according to the present disclosure, it is possible to perform labeling for large amounts of training data quickly and simply by using a trained model to set initial values for labeling of the training data, while simultaneously improving accuracy.

DETAILED DESCRIPTION

Hereinafter, embodiments of the present disclosure will be described in detail with reference to the accompanying drawings. In the following, specific descriptions of functions and configurations already known in the art are omitted if it is deemed that they may unnecessarily obscure the essence of the present disclosure. In addition, it is to be understood that the following description relates merely to one embodiment of the present disclosure and is not intended to limit the present disclosure.

The terms used in the present disclosure are used merely to describe specific embodiments and are not intended to limit the present disclosure. For example, a component expressed in the singular is to be understood as including a plurality of components unless the context clearly indicates that the singular is intended. It is to be understood that the term "and/or" as used in this disclosure is intended to encompass any and all possible combinations of one or more of the enumerated items. The terms "include" or "have" as used in the present disclosure are intended merely to designate the presence of the features, numbers, operations, components, parts, or combinations thereof described herein, and the use of such terms is not intended to exclude the possibility of the presence or addition of one or more other features, numbers, operations, components, parts, or combinations thereof.

In some embodiments of the present disclosure, a 'module' or 'unit' refers to a functional unit that performs at least one function or operation, and may be implemented in hardware or software, or a combination of hardware and software. Furthermore, a plurality of 'modules' or 'units' may be integrated into at least one software module and implemented by at least one processor, with the exception of 'modules' or 'units' that need to be implemented in specific hardware.

Further, unless otherwise defined, all terms used in this disclosure, including technical or scientific terms, may have the same meaning as commonly understood by one of ordinary skill in the art to which the present disclosure belongs. It is to be understood that commonly used dictionary-defined terms should be construed to have a meaning consistent with their contextual meaning in the relevant art and are not to be construed as unduly limiting or expanding unless expressly defined otherwise in the present disclosure.

Hereinafter, a method for automated extraction of image data features according to one embodiment of the present disclosure will be described in detail with reference to the following drawings.

Figure 1:
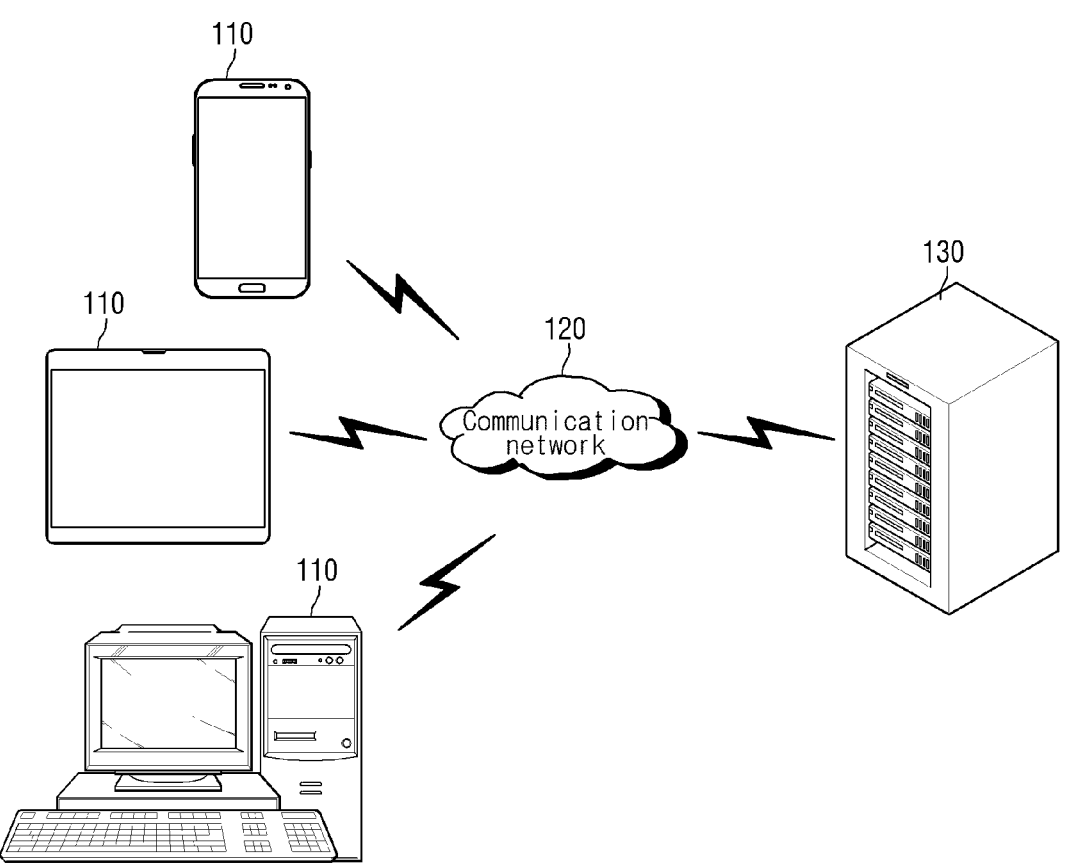
FIG. 1 illustratively shows a schematic configuration of a training data creating system environment according to one embodiment of the present disclosure.

FIG. 1 illustratively shows a schematic configuration of a training data creating system environment according to one embodiment of the present disclosure.

As shown in FIG. 1, a training data creating system 100 according to one embodiment of the present disclosure may include a plurality of user terminals 110, a communication network 120, and a training data creating server 130.

The user terminal 110 according to one embodiment of the present disclosure is a digital device that includes the capability to access and communicate with the training data creating server 130 via the communication network 120. The user terminal 110 may be a portable digital device having memory means and computing capability by means of a microprocessor, such as a smartphone, tablet PC, or the like, and is not limited to any particular form. Three user terminals are illustrated in the present drawings, but the present disclosure is not limited thereto.

According to one embodiment of the present disclosure, various forms of user input received on the user terminal 110 may be communicated to the training data creating server 130 via the communication network 120. According to one embodiment of the present disclosure, the user terminal 110 may receive various signals transmitted from an external source (e.g., the training data creating server 130) via the communication network 120.

According to one embodiment of the present disclosure, the user terminal 110 may include an application to support functionality according to the present disclosure. Such an application may be downloaded from the training data creating server 130 or an external application distribution server (not shown).

The communication network 120 according to one embodiment of the present disclosure may include any communication modality, such as wired communication or wireless communication, and may include various communication networks, such as a local area network (LAN), a metropolitan area network (MAN), or a wide area network (WAN). Preferably, the communication network 120 referred to herein may be the public Internet or the World Wide Web (WWW). However, the communication network 120 may also include, at least in part, a publicly available wired or wireless data communication network, a publicly available telephone network, or a publicly available wired or wireless television communication network, without necessarily being limited thereto.

For example, the communication network 120 may be a wireless data communication network implementing, at least in part, communication methods in the related art such as wireless fidelity (WiFi) communication, WiFi-Direct communication, Long Term Evolution (LTE) communication, Bluetooth communication (e.g., Bluetooth Low Energy (BLE) communication), infrared communication, ultrasonic communication, and the like.

The training data creating server 130 according to one example embodiment of the present disclosure may perform labeling for model training on predetermined image data and provide it as training data. In one embodiment of the present disclosure, the training data creating server 130 may perform location box labeling on image data including fashion items, and may perform attribute labeling of items included in the location box to provide as training data.

Figure 2:
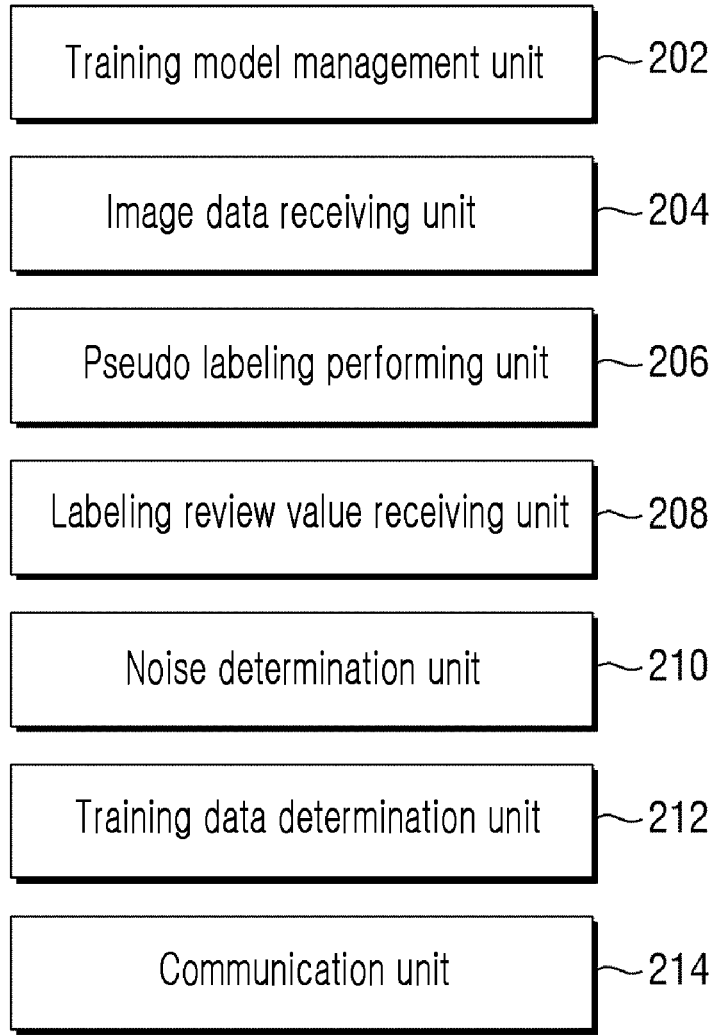
FIG. 2 is a block diagram schematically illustrating a functional configuration of a training data creating server according to one embodiment of the present disclosure.

FIG. 2 is a block diagram schematically illustrating a functional configuration of a training data creating server according to one embodiment of the present disclosure.

Referring to FIG. 2, the training data creating server 130 may include a training model management unit 202, an image data receiving unit 204, a pseudo labeling performing unit 206, a labeling review value receiving unit 208, a noise determination unit 210, a training data determination unit 212, and a communication unit 214. The components shown in FIG. 2 do not reflect all of the features of the training data creating server 130, nor are they essential, and the training data creating server 130 may include more or fewer components than those shown.

According to one embodiment of the present disclosure, the training model management unit 202, the image data receiving unit 204, the pseudo labeling performing unit 206, the labeling review value receiving unit 208, the noise determination unit 210, the training data determination unit 212, and the communication unit 214 of the training data creating server 130 may be modules, at least some of which communicate with an external system. These program modules may be included in the training data creating server 130 in the form of operating systems, application modules, or other program modules, and may be physically stored in various public memory devices. Further, such program modules may be stored on a remote memory device communicable with the training data creating server 130. Meanwhile, such program modules may include, but are not limited to, routines, subroutines, programs, objects, components, data structures, and the like that perform certain tasks described herein according to the present disclosure or perform certain abstract data types.

According to one embodiment of the present disclosure, the training model management unit 202 may generate a training model. In one embodiment, the training model management unit 202 may generate an item location detection model and an item attribute recognition model. In another embodiment, the training model management unit 202 may receive externally generated training models. In one embodiment, the training model management unit 202 may generate some of the item location detection models or item attribute recognition models, and receive some of them externally.

According to one embodiment of the present disclosure, the training model management unit 202 may manage a training model. In one embodiment, the training model management unit 202 may manage an item location detection model that sets a box layout at a location of a fashion item in an image including the fashion item. In another embodiment, the training model management unit 202 may manage an item attribute recognition model that recognizes various attributes of a fashion item in an image comprising the fashion item.

In one embodiment, the training model management unit 202 may train the training model based on the training data. In one embodiment, the training model management unit 202 may train the training model using the training data provided by the training data determination unit 212, which will be described later. For example, the training model management unit 202 may train a training model (e.g., an item location detection model) by using the image data labeled with the location box, which will be described later. Further, in one embodiment, the training model management unit 202 may train a training model (e.g., an item attribute recognition model) by using the image data labeled with attributes, as will be described later.

According to one embodiment of the present disclosure, the training model management unit 202 may provide a training model under management. In one embodiment, the training model management unit 202 may provide a training model to the pseudo labeling performing unit 206. For example, the training model management unit 202 may provide an item location detection model or an item attribute recognition model to the pseudo labeling performing unit 206. In another embodiment, the training model management unit 202 may provide a training model to the noise determination unit 210. The training model management unit 202 may provide the item location detection model or the item attribute recognition model to the noise determination unit 210.

According to one embodiment of the present disclosure, the image data receiving unit 204 may perform a function of receiving predetermined image data. According to one embodiment of the present disclosure, the image data receiving unit 204 may receive image data comprising at least one fashion item. In one embodiment, the image data receiving unit 204 may receive image data comprising at least one fashion item from an online marketplace or a social network system (SNS).

According to one embodiment of the present disclosure, the pseudo labeling performing unit 206 may perform pseudo labeling using a training model on the image data. In one embodiment, the pseudo labeling performing unit 206 may perform pseudo labeling using a training model on the image data provided by the image data receiving unit 204. In one embodiment, the pseudo labeling performing unit 206 may perform pseudo labeling using a training model provided by the training model management unit 202 for the image data. In one embodiment of the present disclosure, the pseudo labeling performing unit 206 may determine an item location box indicating a location of a fashion item included in the image data using the item location detection model provided by the training model management unit 202 (i.e., location box labeling). Here, the location box labeling result value may be calculated as coordinate values on the image data. In one embodiment of the present disclosure, the pseudo labeling performing unit 206 may determine an attribute for the item within the item location box using an item attribute recognition model provided by the training model management unit 202. Here, the attributes may include a category of the fashion item, a material, a color, a length, a neckline, a fit, a pattern, a style, and the like. In one embodiment, the attribute labeling result value may be calculated as "Top, Bottom, Outerwear, and the like (Category)", "Cotton, Synthetic, Knit, Denim, and the like (Material Texture)", "White, Black, Beige, and the like (Color)", "Long Sleeve, 7-Sleeve, Short Sleeve, and the like (Length)", "Round Neck, V-neck, Hood, and the like (Neckline)", "Normal, Oversized, Wide, Tight, and the like (Fit)", "Plain, Graphic, Stripe, Lettering, Check, and the like (Pattern)", "Casual, Feminine, Office Look, and the like (Style)".

According to one embodiment of the present disclosure, the pseudo labeling performing unit 206 may perform pseudo labeling by using a training model on the image data and calculate a probability value (hereinafter, referred to as a 'labeling confidence value') indicating the accuracy of the labeling result. In one embodiment of the present disclosure, the pseudo labeling performing unit 206 may perform item location box labeling using an item location detection model on the image data and calculate a location box labeling confidence value. Here, the location box labeling confidence value may be a probability value indicating the accuracy of the location box labeling performed using the item location detection model. For example, the location box labeling confidence value may be a probability value indicating the accuracy of whether the item location box fully encompasses the item.

In one embodiment of the present disclosure, the pseudo labeling performing unit 206 may use the location box labeling result value as is if the location box labeling confidence value meets a predetermined criterion (a predetermined third criterion). In one embodiment, the pseudo labeling performing unit 206 may determine the location box labeling result value to be an arbitrary value (e.g., a null value) if the location box labeling confidence value does not meet the predetermined third criterion.

According to one embodiment of the present disclosure, the pseudo labeling performing unit 206 may perform attribute labeling for an item included in a labeled item location box in the image data and calculate an attribute labeling confidence value, by using an item attribute recognition model. Here, the attribute labeling confidence value may be a probability value indicating the accuracy of the attribute labeling performed using the item attribute recognition model. In one embodiment, the pseudo labeling performing unit 206 may omit attribute labeling for item location boxes where the location box result value is determined to be a null value.

In one embodiment of the present disclosure, the pseudo labeling performing unit 206 may use the attribute labeling result value as is if the attribute labeling confidence value meets a predetermined criterion (a predetermined fourth criterion). In one embodiment, the pseudo labeling performing unit 206 may determine the attribute labeling result value to be an arbitrary value (e.g., a null value) if the attribute labeling confidence value does not meet the predetermined fourth criterion.

In one embodiment of the present disclosure, the pseudo labeling performing unit 206 may provide the performed labeling result value to the user terminal 110. In one embodiment, the pseudo labeling performing unit 206 may provide the user terminal 110 with a location box labeling result value and an attribute labeling result value for the image data. In one embodiment of the present disclosure, the pseudo labeling performing unit 206 may provide the user terminal 110 with the performed labeling result value and the confidence value of the performed labeling result value together.

In one embodiment of the present disclosure, the labeling review value receiving unit 208 may perform a function of receiving a user's review value for the labeling result value performed by the pseudo labeling performing unit 206. In one embodiment of the present disclosure, the labeling review value receiving unit 208 may receive a user's location box review value and an attribute review value for the location box labeling result value and the attribute labeling result value. In one embodiment, the labeling review value may be a manager's review value for the location box labeling result value and the attribute labeling result value, such that the manager has corrected an error in the location box labeling result value and the attribute labeling result value.

In one embodiment of the present disclosure, the labeling review value receiving unit 208 may preferentially receive location box review values for image data that includes location box labeling with a low location box labeling confidence value. In one embodiment of the present disclosure, the labeling review value receiving unit 208 may preferentially receive attribute review values for image data and item location boxes that include attribute labeling with a low attribute labeling confidence value.

In one embodiment of the disclosure, the location box review value may be the same as the location box labeling result value, and the attribute review value may be the same as the attribute labeling result value. In other embodiments of the disclosure, the location box review value may be different from the location box labeling result value, and the attribute review value may be different from the attribute labeling result value. In one embodiment, the labeling review value receiving unit 208 may receive new location box review values and attribute review values for the portion that have been not labeled portion by the pseudo labeling performing unit 206. In one embodiment, the labeling review value receiving unit 208 may receive the location box review value and the attribute review value as an arbitrary value (e.g., a null value) for the location box labeling result value and the attribute labeling result value that have been labeled by the pseudo labeling performing unit 206.

In one embodiment of the present disclosure, the noise determination unit 210 may function to determine a noise value for the user's review value. Here, the noise value is a probability value indicating the accuracy of the review value, which may be determined by comparing the review value to a value predicted by the training model.

In one embodiment of the present disclosure, the noise determination unit 210 may determine a location noise value for the location box review value by using an item location detection model. In one embodiment, the noise determination unit 210 may determine the location noise value by determining an item location box prediction value using the item location detection model and comparing the item location box prediction value to the location box review value of the corresponding image data. In one embodiment of the present disclosure, the noise determination unit 210 may determine an attribute noise value for the attribute review values by using an item attribute recognition model. In one embodiment, the noise determination unit 210 may determine the attribute noise values for each attribute by determining the attribute prediction values using the item attribute recognition model and comparing the attribute prediction values to the respective attribute review values for the attributes of the item in the item location box.

In one embodiment of the present disclosure, the training data determination unit 212 may perform a function of determining whether to use the labeled data as training data. In one embodiment of the present disclosure, the training data determination unit 212 may determine the labeled data as training data if the noise value meets a predetermined criterion. In one embodiment, the training data determination unit 212 may determine to receive labeling review values again for that data if the noise value does not meet the predetermined criterion.

In one embodiment of the present disclosure, the training data determination unit 212 may determine the corresponding location box review value as location box training data if the location noise value meets a predetermined criterion (a predetermined first criterion). In one embodiment, the training data determination unit 212 may determine to receive a location box review value again from the labeling review value receiving unit 208 for corresponding location box if the location noise value does not meet the predetermined first criterion. In other embodiments, the training data determination unit 212 may discard the corresponding training data if the location noise value does not meet the predetermined first criterion.

In one embodiment of the present disclosure, the training data determination unit 212 may determine the corresponding attribute review value as attribute training data if the attribute noise value meets a predetermined criterion (a predetermined second criterion). In one embodiment, the training data determination unit 212 may determine to receive an attribute review value again from the relabeling review value receiving unit 208 for the corresponding attribute if the attribute noise value does not meet the predetermined second criterion. In other embodiments, the training data determination unit 212 may discard the corresponding training data if the attribute noise value does not meet the predetermined second criterion.

In one embodiment of the present disclosure, the communication unit 214 may perform a function to enable data transmission to/from the training model management unit 202, the image data receiving unit 204, the pseudo labeling performing unit 206, the labeling review value receiving unit 208, the noise determination unit 210, and the training data determination unit 212.

Figure 3:
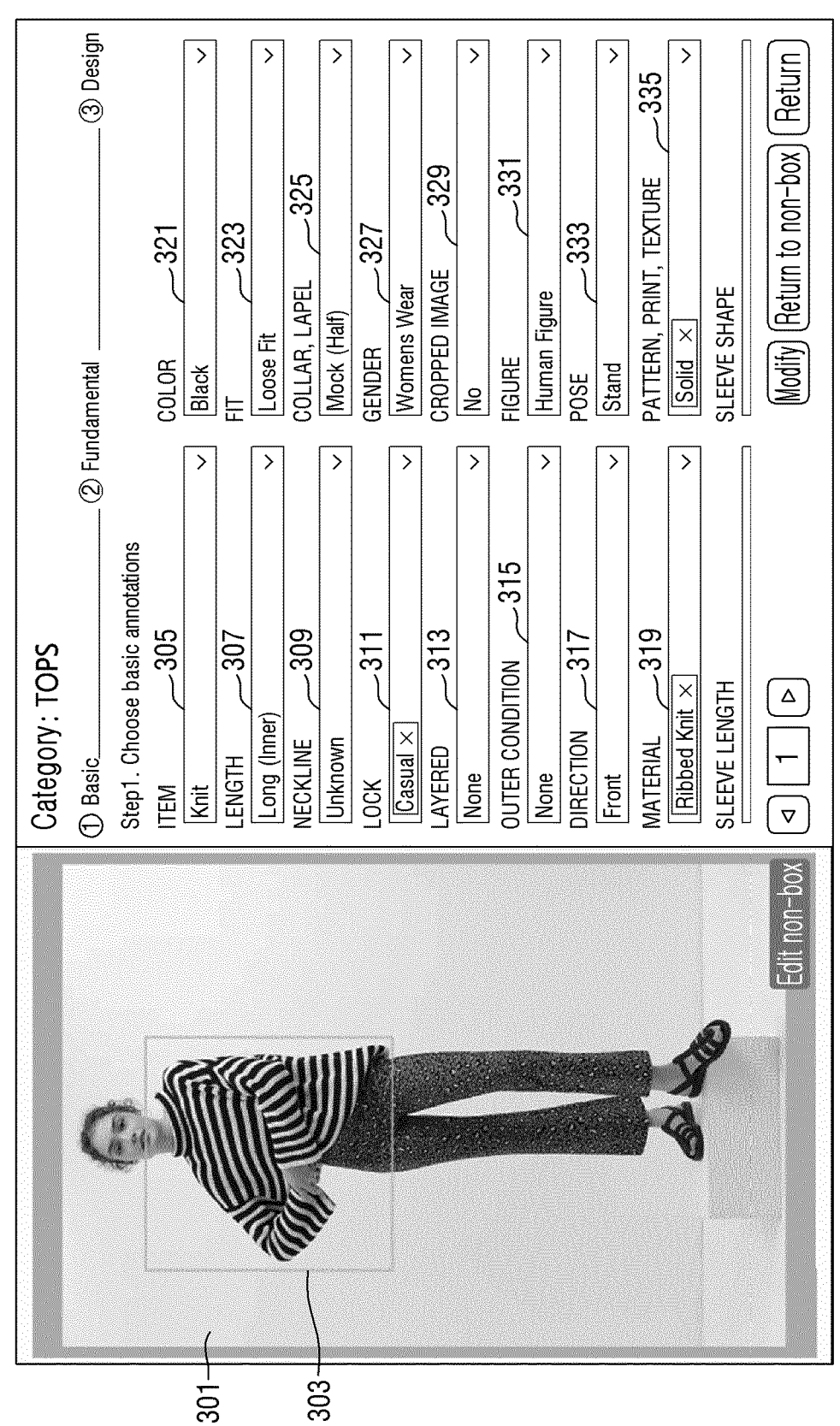
FIG. 3 illustratively shows location box labeling and attribute labeling for items included in image data according to one embodiment of the present disclosure.

FIG. 3 illustratively shows location box labeling and attribute labeling for items included in image data according to one embodiment of the present disclosure.

Referring to FIG. 3, location box labeling and attribute labeling are performed on the image data 301 received by the image data receiving unit 204. In one embodiment, an item location detection model may be used to determine and label an item location box 303 and determine and label respective attribute values 305 to 335 for an item included within the item location box 303.

In one embodiment, the pseudo labeling performing unit 206 may determine an item location box 303 for a top of the image data 301 to perform location box labeling, and the labeling review value receiving unit 208 may receive a user's location box review value for the corresponding location box labeling. In one embodiment, if the location noise value determined by the noise determination unit 210 meets a predetermined criterion, the corresponding location box review value may be determined as the location box training data.

In one embodiment, the pseudo labeling performing unit 206 may perform attribute labeling for a top item included within the item location box 303, such as an item 305, length 307, neckline 309, look 311, layered 313, outer condition 315, orientation 317, material 319, color 321, fit 323, collar and lapels 325, gender 327, cropped image 329, FIG. 331, pose 333, and pattern 335 and the like. In one embodiment, the labeling review value receiving unit 208 receives the user's attribute review value for the corresponding attribute labeling, and if the attribute noise value determined by the noise determination unit 210 meets the predetermined second criterion, the corresponding attribute review value may be determined as the attribute training data.

In FIG. 3, the labeling of the item location box 303 and each of the attributes 305 to 335 has been performed merely for the top worn by the model in the image data 301, but labeling may be performed in the same way for bottoms and shoes.

Figure 4:
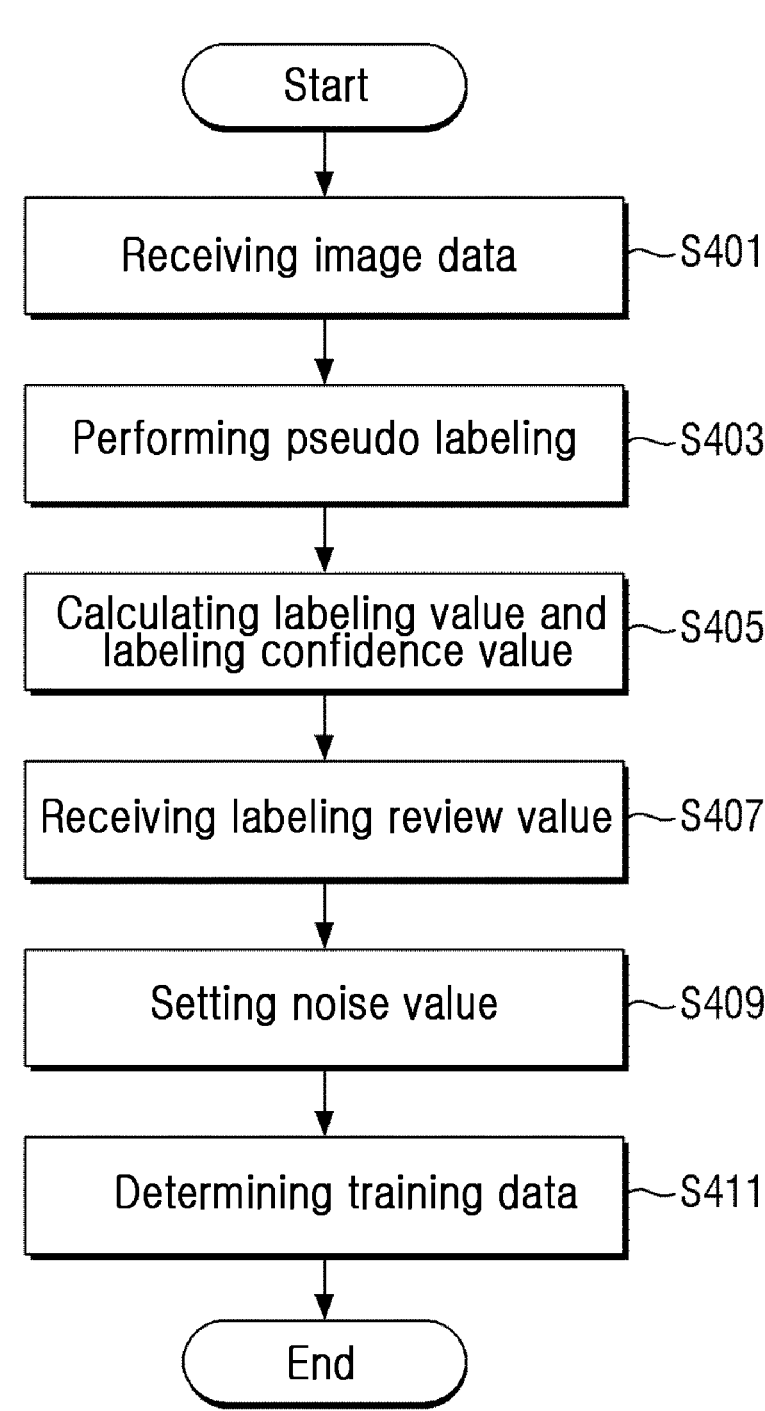
FIG. 4 is a flowchart illustrating a process of performing labeling on image data and determining it as training data according to one embodiment of the present disclosure.

FIG. 4 is a flowchart illustrating a process of performing labeling on image data and determining it as training data according to one embodiment of the present disclosure.

First, in a step S401, the training data creating server 130 may receive predetermined image data. In one embodiment, in the step S401, the image data including at least one fashion item may be received.

Next, in a step S403, the training data creating server 130 may perform labeling on the image data. In one embodiment, the training data creating server 130 may perform the location box labeling by determining an item location box indicating a location of a fashion item included in the image data using an item location detection model. In one embodiment, the training data creating server 130 may perform attribute labeling by determining an item attribute within the item location box using an item attribute recognition model.

In a step S405, the training data creating server 130 may calculate the labeling result value and the labeling confidence value. In one embodiment of the present disclosure, the training data creating server 130 may calculate the location box labeling result value and the location box labeling confidence value, and determine the location box labeling result value based on the location box labeling confidence value. In one embodiment, the training data creating server 130 may calculate the attribute labeling result value and the attribute labeling confidence value, and determine the attribute labeling result value based on the attribute labeling confidence value.

In a step S407, the training data creating server 130 may receive the labeling review values. In one embodiment, the training data creating server 130 may receive location box review values and attribute review values reviewed by a user for the location box labeling result values and the attribute labeling result values.

Next, in a step S409, the training data creating server 130 may determine a noise value. In one embodiment, the training data creating server 130 may determine the item location box prediction value and the item attribute prediction value using the item location detection model and the item attribute recognition model, respectively, for the location box review value and the attribute review value, and determine the location noise value and the attribute noise value by comparing them with the location box review value and the attribute review value, respectively.

Finally, in a step S411, the training data creating server 130 may determine the training data that performed location box labeling and attribute labeling on the image data. In one embodiment, the training data creating server 130 may determine the location noise value as the location box training data if the location noise value meets the predetermined first criterion, and determine the attribute noise value as the attribute training data if the attribute noise value meets the predetermined second criterion.

In the embodiments of the present disclosure described above with reference to the drawings (and throughout this specification), the user terminal 110 and the training data creating server 130 are illustrated as being implemented based on a client-server model, particularly wherein the client primarily provides user input and output functions and most other functions (particularly many functions related to training data creating) are delegated to the server, but the present disclosure is not limited thereto. It is to be appreciated that, according to other embodiments of the present disclosure, the training data creating system environment may be implemented with its functionality evenly distributed between the user terminal and the server, or it may be implemented more dependent on the application environment installed on the user terminal. Furthermore, it is to be understood that when the functions of the training data creating system are implemented by distributing them between user terminals and servers according to one embodiment of the present disclosure, the distribution of each function of the training data creating system between clients and servers may be implemented differently in accordance with embodiments. It is to be appreciated that, according to one embodiment of the present disclosure, the main functions of the training data creating system 100 may be implemented and provided on each user terminal 110 rather than on the training data creating server 130.

Further, in the foregoing embodiments of the present disclosure, it is described as certain modules performs certain actions for convenience, but the present disclosure is not limited thereto. It is to be appreciated that in other embodiments of the present disclosure, each of the operations described above as being performed by a particular module may be performed by a different, separate module.

The programs executed by the terminals and servers described in the present disclosure may be implemented as hardware components, software components, and/or a combination of hardware components and software components. The programs may be executed by any system capable of executing computer-readable instructions.

Software may include computer programs, code, instructions, or one or more combinations thereof, and may compose processing devices to operate as desired, or may independently or collectively instruct processing devices. The software may be implemented as a computer program including instructions stored on computer-readable storage medium. Computer-readable storage media may include, for example, magnetic storage media (e.g., read-only memory (ROM), random-access memory (RAM), floppy disks, hard disks, and the like.) and optical-readable medium (e.g., CD-ROM, digital versatile disc (DVD)). A computer-readable recording medium may be distributed across networked computer systems so that computer-readable code may be stored and executed in a distributed manner. The medium is readable by a computer and may be stored in memory and executed by a processor.

A computer-readable storage medium may be provided in the form of a non-transitory storage medium. In this context, 'non-transitory' means that the storage medium does not contain signals and is tangible, and does not distinguish whether the data is stored on the storage medium on a semi-permanent or temporary basis.

Further, programs according to embodiments of the present disclosure may be provided in a computer program product. The computer program may be traded between a seller and a buyer as a commodity. A computer program may include a software program and a computer-readable storage medium on which the software program is stored. For example, a computer program may include a product (e.g., a downloadable application) in the form of a software program that is distributed electronically by a device manufacturer or through an electronic marketplace (e.g., Google Play Store, App Store). For electronic distribution, at least a portion of the software program may be stored on a storage medium or may be temporarily generated. In this case, the storage medium may be the storage medium of a manufacturer's server, an e-marketplace's server, or a relay server that temporarily stores the software program.

In a system including a server and a device, the computer program may include a storage medium of the server or a storage medium of the device. Alternatively, in the presence of a third device (e.g., a smartphone) in communication with the server or the device, the computer program may include a storage medium of the third device. Alternatively, the computer program may include the software program itself that is transmitted from the server to the device or third device, or from the third device to the device. In this case, one of the server, the device, and the third device may execute the computer program to perform the methods according to the disclosed embodiments. Alternatively, two or more of the server, the device, and the third device may execute the computer program to distributedly perform the methods of the disclosed embodiments. For example, a server may execute a computer program stored on the server to control a device in communication with the server to perform methods according to disclosed embodiments. In another example, a third device may execute a computer program to control a device in communication with the third device to perform a method according to a disclosed embodiment. When the third device executes the computer program, the third device may download the computer program from a server and execute the downloaded computer program. Alternatively, the third device may execute a computer program that is provided pre-loaded to perform the methods of the disclosed embodiments.

Although embodiments have been described above by way of limited embodiments and drawings, one of ordinary skill in the art will recognize that various modifications and variations are possible from the above description. For example, suitable results may be achieved if the described techniques are performed in a different order from the methods described, and/or if components of the described computer systems, modules, and the like are combined or assembled in a different form from the methods described, or if other components or equivalents are substituted or replaced.

What is claimed is:

1. A method of creating a training dataset for model training, comprising the steps of:
receiving image data including at least one fashion item;
performing location box labeling on an item location box which indicates a location of an item included in the image data by using an item location detection model, thereby calculating a location box labeling result value and a location box labeling confidence value;
maintaining the location box labeling result value or changing the location box labeling result value to a null value, based on the and a location box labeling confidence value and a predetermined criterion;
receiving a user's location box review value for the maintained or changed location box labeling result value;
determining an item location box prediction value for the image data by using the item location detection model;
determining a location noise value indicating an accuracy of the location box review value by comparing the location box review value and the item location box prediction value;
determining the location box review value as location box training data if the location noise value meets a predetermined first criterion; and
creating the training dataset by associating the location box training data with the image data.

2. The method of claim 1, further comprising the steps of:
performing attribute labeling for an attribute of an item located within the item location box by using an item attribute recognition model;
calculating an attribute labeling result value and an attribute labeling confidence value;
receiving a user's attribute review value for the attribute labeling result value;
determining an attribute noise value of the attribute review value by using the item attribute recognition model; and
determining the attribute review value as attribute training data if the attribute noise value meets a predetermined second criterion.

3. The method of claim 2, further comprising: further comprising the step of:
receiving the user's attribute review value again if the attribute noise value does not meet the predetermined second criterion.

4. The method of claim 2, wherein, in the step of calculating the attribute labeling result value and the attribute labeling confidence value, if the attribute labeling confidence value does not meet a predetermined fourth criterion, the attribute labeling result value is determined as a null value.

5. The method of claim 2, further comprising the step of:
training the item attribute recognition model with the attribute training data.

6. The method of claim 2, wherein, in the step of receiving the user's location box review value for the location box labeling result value, the location box review value with a low location box labeling confidence value is preferentially received, and
wherein, in the step of receiving the user's attribute review value for the attribute labeling result value, the attribute review value with a low attribute labeling confidence value is preferentially received.

7. The method of claim 1, wherein, in the step of performing the location box labeling, the item location box is determined such that an item included in the image data is located within the item location box by using the item location detection model, and
in the step of calculating the location box labeling result value and location box labeling confidence value, a coordinate value of the item location box on the image data is determined by using the location box labeling result value, and the location box labeling confidence value indicating an accuracy of the item location box is determined.

8. The method of claim 1, further comprising the step of:
receiving the user's location box review value again if the location noise value does not meet the predetermined first criterion.

9. The method of claim 1, wherein, in the step of maintaining or changing the location box labeling result value, if the location box labeling confidence value does not meet a predetermined third criterion, the location box labeling result value is determined as the null value.

10. The method of claim 1, further comprising the step of:
training the item location detection model with the location box training data.

11. A non-transitory computer-readable recording medium stored thereon a computer program for performing a method of claim 1.

12. A training data creating system for a model training, comprising:
an image data receiving unit configured to receive image data including at least one fashion item;
a pseudo labeling performing unit configured to perform location box labeling for an item location box which indicates a location of an item included in the image data by using an item location detection model, calculate a location box labeling result value and a location box labeling confidence value, and maintain the location box labeling result value or change the location box labeling result value to a null value based on the location box labeling confidence value and a predetermined criterion;
a labeling review value receiving unit configured to receive a user's location box review value for the maintained or changed location box labeling result value;
a noise determination unit configured to determine an item location box prediction value for the image data by using the item location detection model, and determine a location noise value indicating an accuracy of the location box review value by comparing the location box review value and the item location box prediction value; and
a training data determination unit configured to determine the location box review value as location box training data if the location noise value meets a predetermined first criterion, and create a training dataset by associating the location box training data with the image data.

13. The training data creating system of claim 12, wherein the pseudo labeling performing unit is configured to further perform attribute labeling for an attribute of an item located in the item location box by using an item attribute recognition model, and calculate an attribute labeling result value and an attribute labeling confidence value;

wherein the labeling review value receiving unit is configured to receive a user's attribute review value for the attribute labeling result value;

wherein the noise determination unit is configured to determine an attribute noise value of the attribute review value by using the item attribute recognition model; and wherein the training data determination unit is configured to determine the attribute review value as attribute training data if the attribute noise value meets a predetermined second criterion.

* * * * *